Figure 5:
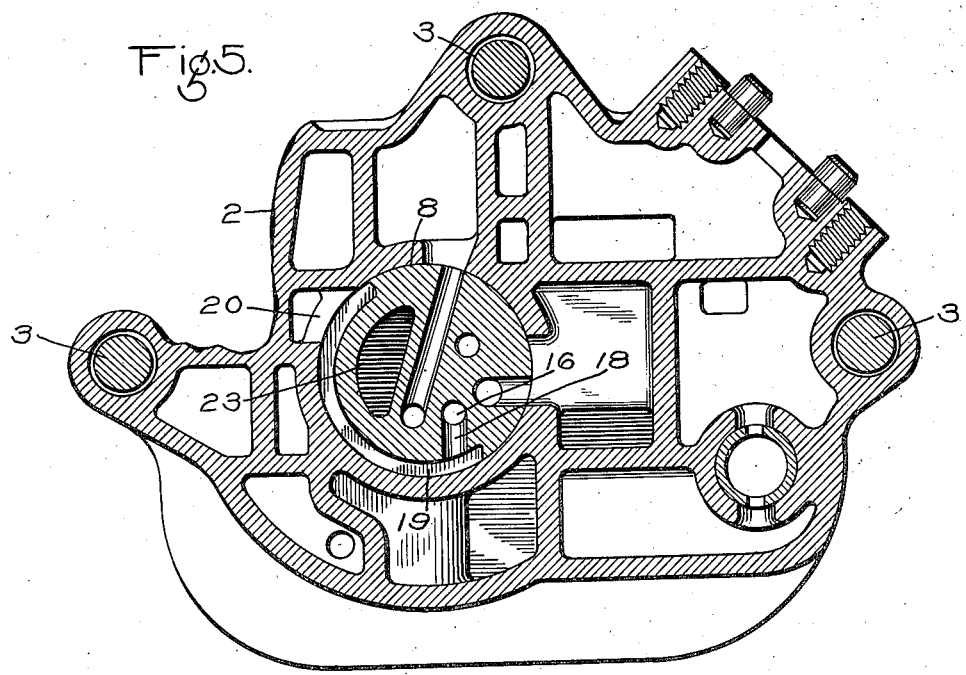

Nov. 24, 1936.  E. E. HEWITT  2,061,906
PEDESTAL BRAKE VALVE DEVICE
Filed Sept. 22, 1934  2 Sheets-Sheet 1
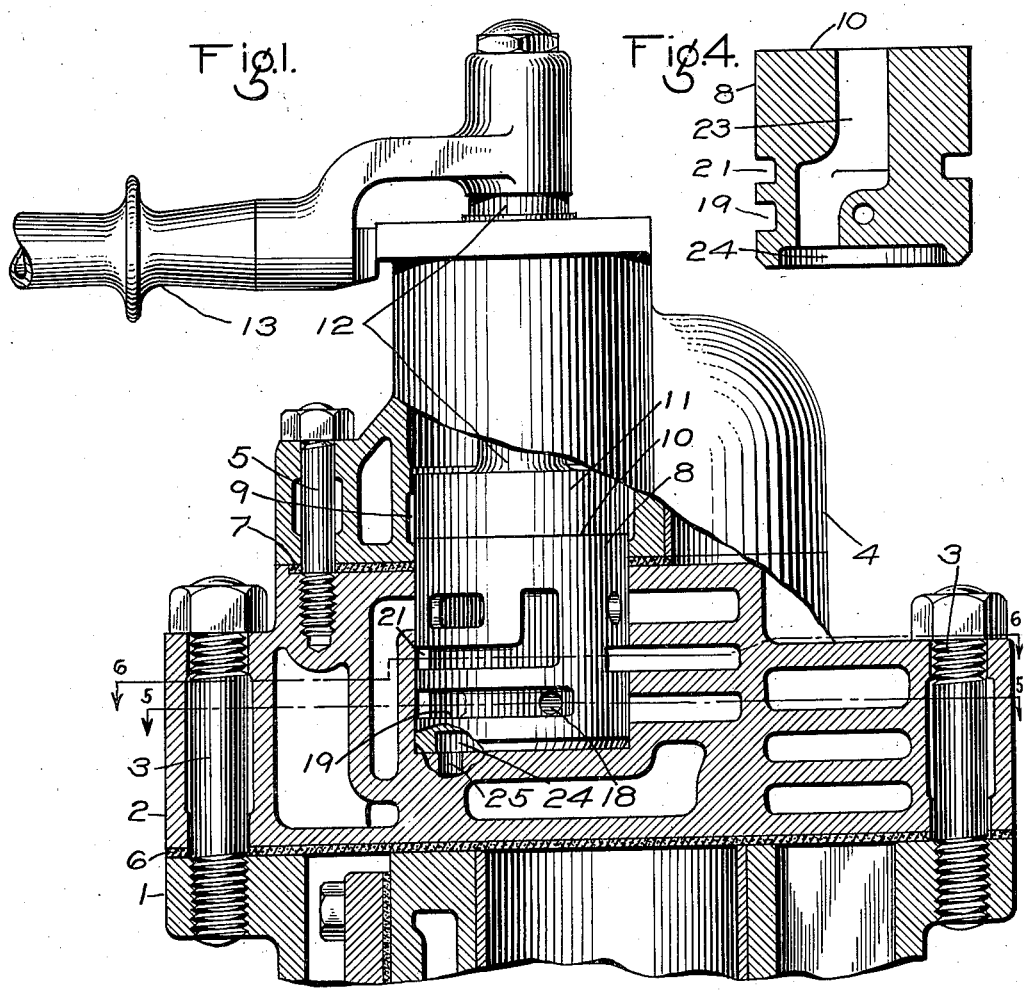
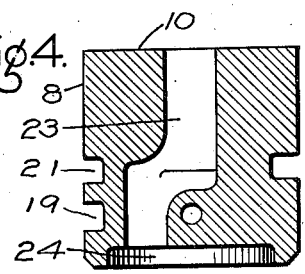
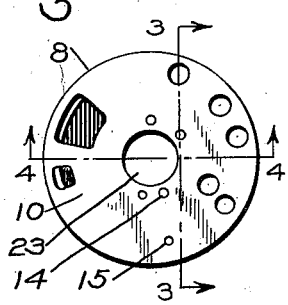
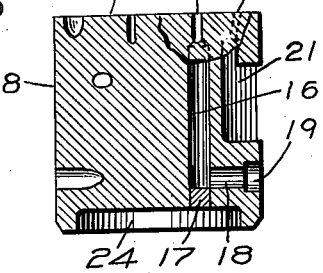
INVENTOR
ELLIS E. HEWITT
BY
Wm. M. Cady
ATTORNEY Nov. 24, 1936.  E. E. HEWITT  2,061,906
PEDESTAL BRAKE VALVE DEVICE
Filed Sept. 22, 1934  2 Sheets-Sheet 2

INVENTOR
ELLIS E. HEWITT
BY Wm. M. Cady
ATTORNEY

Patented Nov. 24, 1936

2,061,906

UNITED STATES PATENT OFFICE 2,061,906

PEDESTAL BRAKE VALVE DEVICE

Ellis E. Hewitt, Edgewood, Pa., assignor to The Westinghouse Air Brake Company, Wilmerding, Pa., a corporation of Pennsylvania Application September 22, 1934, Serial No. 745,082

3 Claims. (Cl. 303—56)

This invention relates to fluid pressure brakes and more particularly to a manually operated brake valve device for controlling the operation of fluid pressure brakes.

The usual brake valve device employed in connection with fluid pressure brakes comprises a body having a rotary valve seat upon which is mounted a rotary valve adapted to be turned to various brake controlling positions by means of a handle.

The body of the brake valve device is provided with a plurality of cored passages many of which lead to and open at the rotary valve seat, while the rotary valve is provided with a plurality of passages, ports and cavities adapted to establish fluid conducting communications between the passages in the body in accordance with the position of the rotary valve on its seat.

The opening of the cored passages in the body at the rotary valve seat must be accurate in order to obtain proper registration with the cavities in the rotary valve in the various brake controlling positions thereof. Some of the passages in the body are provided with branches leading elsewhere than to the rotary valve seat, while some are cored around mechanism included in the body and are therefore tortuous in shape, and each of these passages and branches must be surrounded with a wall which is proof against leakage of fluid under pressure. It will therefore be noted that a brake valve body is intricate in construction and difficult to cast, and one object of the invention is to provide an improved construction of brake valve body in which the above difficulties of manufacture are greatly reduced.

According to the invention, the rotary valve seat is not provided on the brake valve body, but is formed on one end of a round plug, the brake valve body being provided with a bore into which the plug is pressed.

The plug is provided with a plurality of passages, one end of each of the passages leading to the rotary valve seat while the other end of each of the passages leads to cavities formed in the exterior surface of the plug, these cavities registering with passages which open to the surface of the bore and extend through the brake valve body thereby forming fluid conducting communications between the passages in the body and the passages in the plug. By this improved construction the manufacture of brake valves is greatly simplified, and the loss of castings due to shifting of cores, etc., during the process of making the castings is greatly reduced.

In addition to the above, the forming of the rotary valve seat on a plug separate from the brake valve body permits the body of the brake valve device to be made of a light weight metal, such as aluminum or alloys thereof, while the plug upon which the rotary valve seat is formed may be made of another metal, such as cast iron. This type of construction provides a light weight brake valve device as compared to a brake valve device made wholly from cast iron. This light weight construction not only permits easier handling of the brake valve device but is also a very important contribution toward reduction of weight of rolling stock in accordance with the present day trend.

Figure 6:
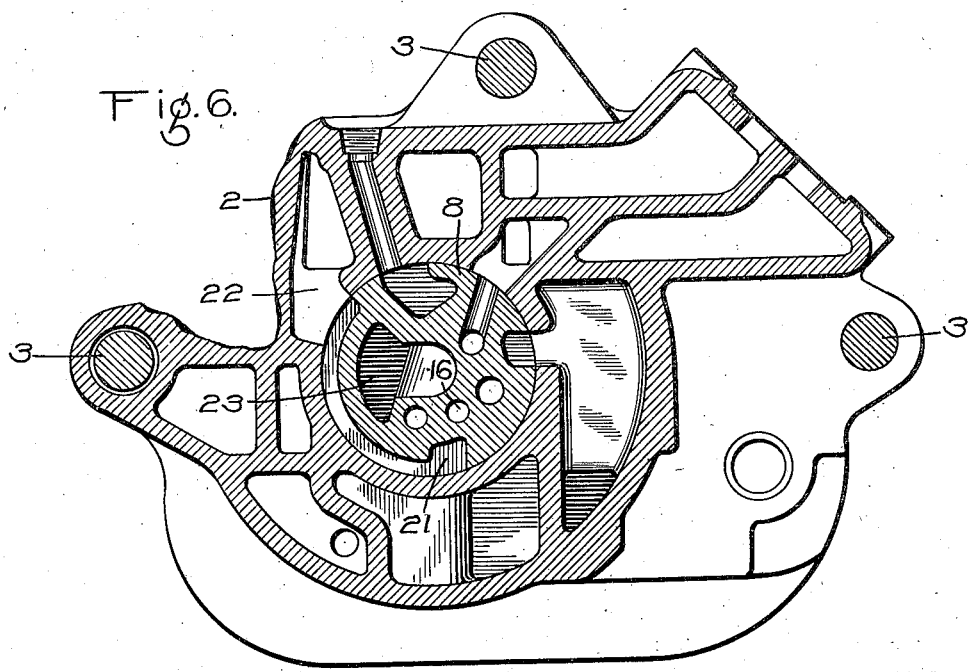

In the accompanying drawings; Fig. 1 is a sectional view of a portion of a brake valve device embodying the invention; Fig. 2 is a plan view of the rotary valve seat employed in the brake valve device shown in Fig. 1; Fig. 3 is a sectional view taken on the line 3—3 of Fig. 2; Fig. 4 is a sectional view taken on the line 4—4 of Fig. 2; Fig. 5 is a sectional view taken on the line 5—5 of Fig. 1; and Fig. 6 is a sectional view taken on the line 6—6 of Fig. 1.

As shown in Fig. 1 of the drawings, the brake valve device is preferably built in sections comprising a bracket 1, a body 2 mounted upon and secured to bracket 1 by means of studs 3, and a bonnet 4 mounted upon and secured to body 2 by means of one or more studs 5. A gasket 6 is interposed between the bracket 1 and body 2 to prevent leakage of fluid under pressure from passages (not shown) which may extend from the bracket 1 into the body 2, while a gasket 7 is provided between body 2 and the bonnet 4 for a similar purpose.

According to the invention, the body 2 is provided with a bore which is preferably of slightly smaller diameter at the bottom than at the top, and a round plug 8 having a taper corresponding to that of said bore is pressed into and to the bottom of said bore providing a leak-proof seal between the engaging surfaces of said body and plug.

The outer end of plug 8 extends slightly into a chamber 9 formed in bonnet 4, and formed on said outer end is a rotary valve seat 10. A rotary valve 11 contained in chamber 9 is mounted to turn on the seat 10 and is operatively connected through the medium of a stem 12 to a manually movable handle 13 in the usual manner.

As shown in Fig. 2 of the drawings, there are a plurality of ports of various sizes and shapes opening at the face of the rotary valve seat 10 and these ports are connected by passages in the plug 8 to passages formed in the body 2 in a manner which will now be described.

By way of example, port 14 which opens to the rotary valve seat 10 is formed by drilling through plug 8 into a drilled passage 16 the outer end of which is closed by a plug 17. A drilled passage 18 at right angles to passage 16 opens at one end into passage 16 and at the other end into a cavity 19 in the circular face of the plug 8, the cavity 19 being preferably formed by coring in the process of molding the plug 8. The outer wall of cavity 19 is formed by the circular surface of the bore containing plug 8, and said cavity extends around the plug 8 a sufficient distance to register with one end of a passage 20 formed in the brake valve body, thereby forming a tortuous fluid conducting communication from passage 20 in the body to port 14 in the rotary valve seat.

As another example, port 15 in the rotary valve seat is drilled through plug 8 into a cavity 21 cored in the circular face of said plug and having one side closed by the circular surface of the bore containing said plug and extending around the plug into registration with one end of a passage 22 formed in the brake valve body.

All ports in the rotary valve seat 10, except port 23, are connected to ports in the brake valve body 2 in a manner similar to ports 14 and 15, so it is not deemed necessary, to a full understanding of the invention, to describe in more detail such connections. The connection from port 23 to the brake valve body differs from that of the other ports only in that instead of being connected to passages in the brake valve body by way of cavities in the circular surface of plug 8, the port 23 extends lengthwise through plug 8 and opens to a chamber 24 in the lower end of said plug, the chamber 24 being in communication with a passage 25 in the brake valve body. It will be noted that chamber 24 is formed within the lower end of plug 8 and has an open end which is closed by the bottom wall of the bore containing said plug.

From the above description it will be noted that the construction of the plug 8 and the brake valve body 2 as individual units is relatively simple since only simple coring is required to provide the cavities and passages desired to be provided in this manner, but when these two units are assembled as shown in Fig. 1, the cooperation of registering cored cavities and passages provide the tortuous fluid conducting communications which it is difficult to obtain when the rotary valve seat is cast integral with the brake valve body.

A further advantage of making the brake valve body and rotary valve seat as individual units is that the body may be made of light weight material such as aluminum or one of its alloys while the rotary valve seat may be made from a different material, such as cast iron, or any other material which it is desired to use as a seat for a rotary valve, and by such construction a light weight device may be obtained as is desired for use in certain light weight rolling stock of the present day.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve device comprising a body having a bore the outer end of which is open and the inner end of which is in communication with a passage in said body, a plug permanently pressed into said bore forming a chamber at the inner end of said bore and having on the outer end a valve seat, said body having a plurality of passages opening to said bore and registering with corresponding cavities in said plug.

2. A valve device comprising a body having a tapered bore open at one end to a plane face of said body and having an inner end wall, a tapered plug permanently pressed into said bore in engagement with said end wall forming below the plug a chamber communicating with a passage in said body, and protruding beyond said plane face and having a valve seat formed on the outer end and also having a plurality of cavities in the peripheral face connected by passages to said valve seat and registering with passages in said body.

3. A valve device comprising a body having a bore open at one end to an outer surface of said body and having an inner end wall, a plug permanently pressed into said bore and bottoming on said wall forming below the plug a chamber communicating with a passage in said body, said plug having in its peripheral face a plurality of cavities registering with passages in said body.

ELLIS E. HEWITT.